US008286170B2

(12) United States Patent
Franaszek

(10) Patent No.: US 8,286,170 B2
(45) Date of Patent: Oct. 9, 2012

(54) SYSTEM AND METHOD FOR PROCESSOR THREAD ALLOCATION USING DELAY-COSTS

(75) Inventor: Peter A. Franaszek, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 1397 days.

(21) Appl. No.: 11/669,724

(22) Filed: Jan. 31, 2007

(65) Prior Publication Data
US 2008/0184240 A1 Jul. 31, 2008

(51) Int. Cl.
G06F 9/455 (2006.01)
G06F 9/46 (2006.01)

(52) U.S. Cl. ............. 718/102; 718/1; 718/103; 718/104

(58) Field of Classification Search .................. None
See application file for complete search history.

(56) References Cited

U.S. PATENT DOCUMENTS

| 5,442,730 | A  | * | 8/1995  | Bigus           | 706/19  |
|-----------|----|---|---------|-----------------|---------|
| 6,993,494 | B1 | * | 1/2006  | Boushy et al.   | 705/10  |
| 7,392,524 | B2 | * | 6/2008  | Ault et al.     | 718/1   |
| 7,512,940 | B2 | * | 3/2009  | Horvitz         | 717/173 |
| 7,707,578 | B1 | * | 4/2010  | Zedlewski et al.| 718/102 |
| 2003/0154112 | A1 | * | 8/2003  | Neiman et al.   | 705/5   |
| 2005/0198231 | A1 | * | 9/2005  | Gasca et al.    | 709/221 |
| 2005/0216324 | A1 | * | 9/2005  | Maithell et al. | 705/8   |
| 2006/0195845 | A1 | * | 8/2006  | Rhine           | 718/102 |
| 2007/0079308 | A1 | * | 4/2007  | Chiaramonte et al. | 718/1 |
| 2007/0143549 | A1 | * | 6/2007  | Saha et al.     | 711/145 |
| 2008/0155100 | A1 | * | 6/2008  | Ahmed et al.    | 709/226 |
| 2008/0235703 | A1 | * | 9/2008  | Crawford et al. | 718/104 |
| 2009/0300605 | A1 | * | 12/2009 | Edwards et al.  | 718/1   |

OTHER PUBLICATIONS

Eskesen et al., "Performance Analysis of Simultaneous Multithreading in a PowerPC-based Processor", IBM Search Report RC22454, May 20, 2002.
Franaszek et al., "Properties of Delay-Cost Scheduling in Time-Sharing Systems", IBM Journal O Research and Development, vol. 39, No. 3, 1995.
Liu et al., "Sample Path Methods in the Control of Queues", UMASS Technical Report 95-09.
Vmware ESX Server 2: Architecture and Performance Implications; Vmware White Paper.
Nagarajayya, "Improving Application Efficiency Through Chip Multi-Threading", Sun Developer Network, Mar. 10, 2005, updated Oct. 2005.

* cited by examiner

Primary Examiner — Jennifer To
Assistant Examiner — Tammy Lee
(74) Attorney, Agent, or Firm — F. Chau & Associates, LLC; Daniel P. Morris

(57) ABSTRACT

A computer system includes a plurality of multi-threaded processors, and a scheduler. The multi-threaded processors each have a set of hardware threads forming a pool of hardware threads. The scheduler allocates hardware threads of the pool of hardware threads to one or more guest operating systems based on priorities of the guest operating systems. The priorities of the guest operating systems are based on logical processors requested by the guest operating systems.

13 Claims, 5 Drawing Sheets

| Jobs | L(i,1) | Q(i,1) | L(i,2) | Q(i,2) | L(i,4) | Q(i,4) |
|---|---|---|---|---|---|---|
| J(1) | 4 | 10 | 8 | 7.5 | 16 | 5 |
| J(2) | 4 | 8 | 8 | 6 | 16 | 4 |
| J(3) | 2 | 6 | 4 | 4.5 | 8 | 3 |
| J(4) | 2 | 4 | 4 | 3 | 8 | 2 |

Results

| Q | 2 | 4 | 6 | 7.5 |
|---|---|---|---|---|
| D | 48 | 38 | 18 | 12 |

FIG. 3

| Jobs | L(1,1) | F(1,4,0) | L(1,2,0) | F(1,8,4) | L(1,4) | F(16,8) |
|---|---|---|---|---|---|---|
| J(1) | 4 | 10 | 8 | 5 | 16 | 2.5 |
| J(2) | 4 | 8 | 8 | 4 | 16 | 2 |
| J(3) | 2 | 6 | 4 | 3 | 8 | 1.5 |
| J(4) | 2 | 4 | 4 | 2 | 8 | 1 |

Results
F      4      5      6
D      48     14     10

FIG. 4 job 1 requests 4 logical processors and there is an allocation of type 1 job 1 requests 4 logical processors and there is an allocation of type 2 job 1 requests 4 logical processors and there is an allocation of type 4 job 1 requests 4 logical processors and there is an allocation of type 1
job 2 requests 4 logical processors and there is an allocation of type 2

SYSTEM AND METHOD FOR PROCESSOR THREAD ALLOCATION USING DELAY-COSTS

TECHNICAL FIELD OF THE INVENTION

The present disclosure relates generally to the field of processor thread allocation, and more specifically to a method and system for processor thread allocation using a delay-cost.

BACKGROUND

Delay-cost (DC) is a measure used by conventional schedulers for scheduling of pending computing jobs in a computer system. Here each computing job in the system is given a time-varying measure of the (i) cost of delaying its processing or of the (ii) value of assigning a processor. The scheduler chooses a computing job to be run with the highest DC value. This approach is used successfully in single-threaded, single-cored processors, where a computing job is assigned one processor at a time. However, the tendency in modern processor design is to incorporate multiple cores on one chip, and have each core incorporate multiple hardware threads. A software thread may be dispatched for execution on a hardware thread. A computing job may include several software threads which may each be dispatched on hardware threads of a single core or distributed amongst hardware threads of multiple cores. It can be a complex task to efficiently schedule the execution of computing jobs that have several software threads on multiple cores.

Today, it may be desirable for a computer system to run more than one guest operating system. Each guest operating system can be considered a computing job, having multiple threads and/or processes. Modern systems can make use of software known as a hypervisor to manage one or more such guest operating systems and the resources that they require. A hypervisor typically includes a scheduler to allocate some number of processors to each guest operating system. The scheduler determines which operating system guest to run, how many cores or partial cores to assign to each guest, and which cores to assign.

A hypervisor scheduler according to the conventional art assigns a "fair share" quantity to each operating system guest. Guests may be assigned uninterruptible time slices for executing their jobs. Guests which have received less than their fair share of time may be given priority over those that have received more. Although such conventional schedulers can provide good performance in a variety of situations, they do not explicitly address such problems as scheduling multiple simultaneously executing threads ting system scheduling context, or multiple requested processors in a hypervisor context. Further, they do not explicitly incorporate tradeoffs associated with core or hardware thread assignments, or include energy usage tradeoffs.

Thus, there is a need for an improved method and a system for scheduling the allocation of threads which incorporates delay cost.

SUMMARY OF THE INVENTION

According to an exemplary embodiment of the present invention, a computer system is provided which includes a plurality of multi-threaded processors, and a scheduler. The multi-threaded processors each have a set of hardware threads which form a pool of hardware threads. The scheduler allocates hardware threads of the pool of hardware threads to one or more guest operating systems based on priorities of the guest operating systems. The priorities are based on logical processors requested by the guest operating systems. The scheduler may further allocate the hardware threads of the pool based on an optimization of a sum of the priorities. The priorities may also be based on an amount of processor power allocated to a guest operating system and may vary with time.

The priorities may be further based on a cost that a corresponding one of the guest operating systems pays for a number of the logical processors it requests.

The cost may be based on a number of the pool of hardware threads that the number of logical processors represents. The cost may be further based on an amount of energy consumed by processing a corresponding one of the guest operating systems on the number of the pool of hardware threads that the set of logical processors represents.

The optimization may comprise maximizing the sum of priorities or maximizing the sum of priorities subject to a fairness criterion. The multi-threaded processors may be divided into processor pools and the optimization can be performed separately within each processor pool. A load of the computer system may be balanced by sending a new guest operating system to a corresponding one of the processor pools that has a lowest pool priority, wherein the pool priority is based on the priorities of each of the guest operating systems in the processor pool.

According to an exemplary embodiment of the present invention, a system for scheduling computing jobs in a computer system is provided. The system includes an allocation unit and an assignment unit. The allocation unit determines configurations of hardware resources to be used by a plurality of computing jobs according to a schedule computed by an optimization of an objective function over a plurality of logical processors requested by the computing jobs. The assignment unit assigns one or more of the configurations of hardware resources to the computing jobs. The objective function is based on a sum of costs that each of the computing jobs pays for a corresponding one of the configurations of hardware resources.

Each of the configurations of hardware resources may include a set of the logical processors that represent a number of hardware threads. The optimization may comprise maximizing the objective function or maximizing the objective function subject to a fairness criterion.

According to an exemplary embodiment of the present invention, a method of scheduling guest operating systems is provided. The method includes the steps of receiving requests for sets of logical processors from guest operating systems, determining delay-costs that each of the guest operating systems pay for an assignment of nominal processing power, determining generalized delay-costs based on the delay-costs and the requested sets of logical processors, and scheduling one or more of the guest operating system to be run on corresponding sets of hardware threads of a computer system by optimizing a sum of the generalized delay-costs.

According to an exemplary embodiment of the present invention, a program storage device readable by machine, tangibly embodying a program of instructions executable by the machine to perform method steps for scheduling guest operating systems on a computer system is provided. The method steps include receiving requests for sets of logical processors from a plurality of guest operating systems, determining a plurality of delay costs that, each of the guest operating systems pay for an assignment of nominal processing power, determining a plurality of generalized delay-costs based on the delay-costs and the requested sets of logical processors, and scheduling one or more of the guest operating systems to be run on corresponding sets of hardware threads of a computer system by optimizing a sum of the generalized delay-costs.

These and other exemplary embodiments, aspects, features and advantages of the present invention will be described or become more apparent from the following detailed description of exemplary embodiments, which is to be read in connection with the accompanying figures.

BRIEF DESCRIPTION OF THE DRAWINGS

FIG. 3 is table which illustrates scheduling guest operating systems by maximizing a sum of generalized delay-costs subject to a fairness criterion, according to an exemplary embodiment of the present invention.

FIG. 4 is table which illustrates scheduling guest operating by maximizing a sum of generalized delay-costs, according to an exemplary embodiment of the present invention.

DETAILED DESCRIPTION OF EXEMPLARY EMBODIMENTS

In general, exemplary embodiments systems and methods to perform scheduling of guest operating systems or computing jobs on multi-threaded processors with now be discussed in further detail with reference to illustrative embodiments of FIGS. 1-5.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
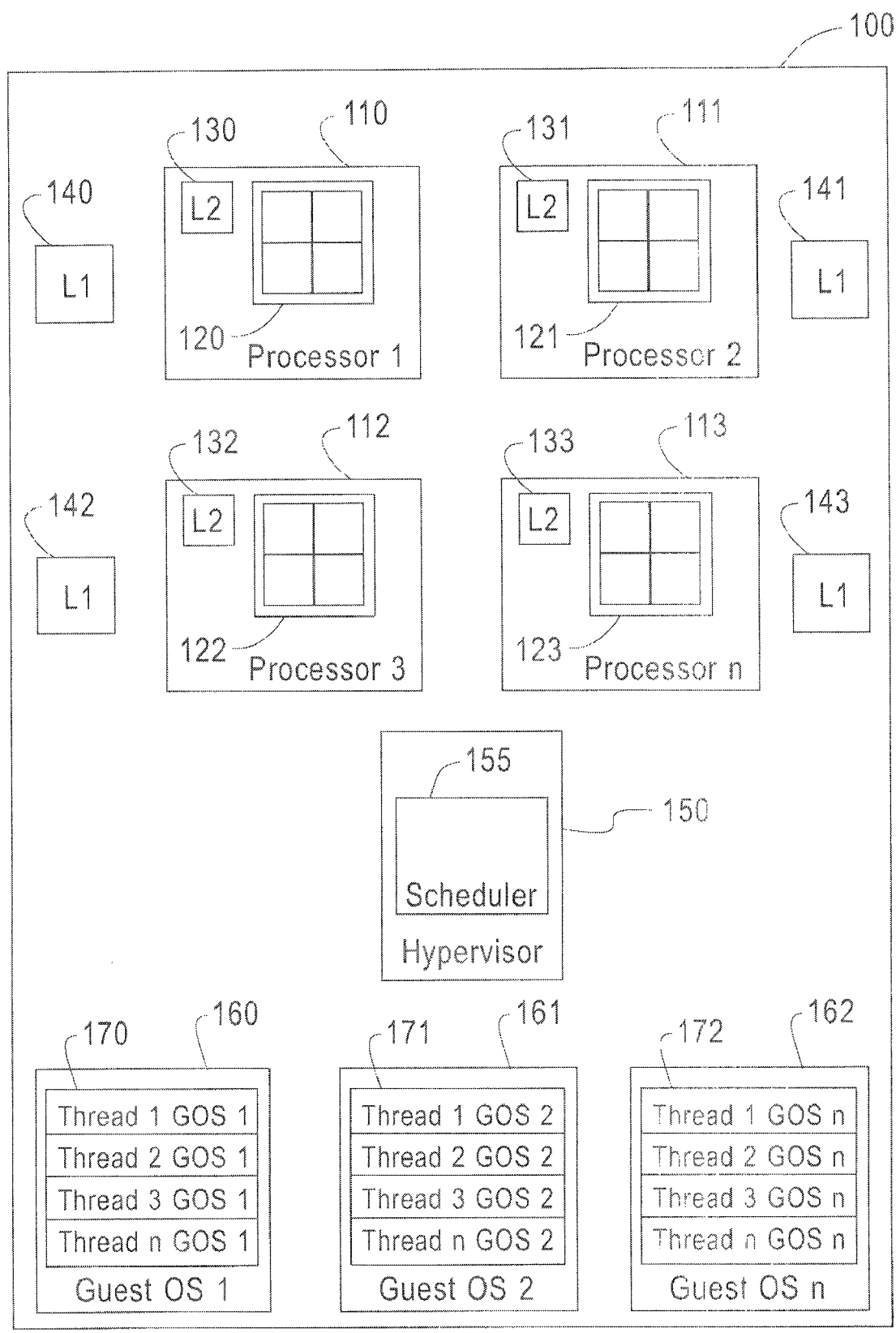
FIG. 1 is a high-level block diagram of a computer system which schedules guest operating systems according to an exemplary embodiment of the present invention.

FIG. 1 is a high-level block diagram of a computer system 100, according to an exemplary embodiment of the present invention. Referring to FIG. 1, the computer system 100 includes multi-threaded processors 110, 111, 112, 113, L1 caches 140, 141, 142, 143, L2 caches 130, 131, 132, 133, a hypervisor 150, and guest operating systems 160, 161, 162.

The multi-threaded processors 110, 111, 112, 113 include corresponding sets of hardware threads 120, 121, 122, 123 for executing software threads 170, 171, 172 of the guest operating systems 160, 161, 162.

The hypervisor 150 provides resources of the computer system to the guest operating systems 160, 161, 162 or computing jobs. The hypervisor 150 includes a scheduler 155. The scheduler is for scheduling the guest operating systems 160, 161, 162 to be run on the sets of hardware threads 120, 121, 122, 123.

The hypervisor 150 may schedule other computing jobs in addition to the guest operating systems 160, 161, 162 on the sets of hardware threads 120, 121, 122, 123. In addition, each of the guest operating systems 160, 161, 162 may be considered a computing job.

Exemplary modes of operating the system of FIG. 1 will now be explained with reference to FIG. 2. Although the computer systems 100 of FIG. 1 illustrates a certain number of processors, L1 caches, L2 caches, hardware threads, software threads, and guest operating systems, it is to be understood that FIG. 1 is merely an illustrative embodiment and there can be any number of processors, L1 caches, L2 caches, hardware threads, software threads, and guest operating systems depending on the application.

Figure 2:
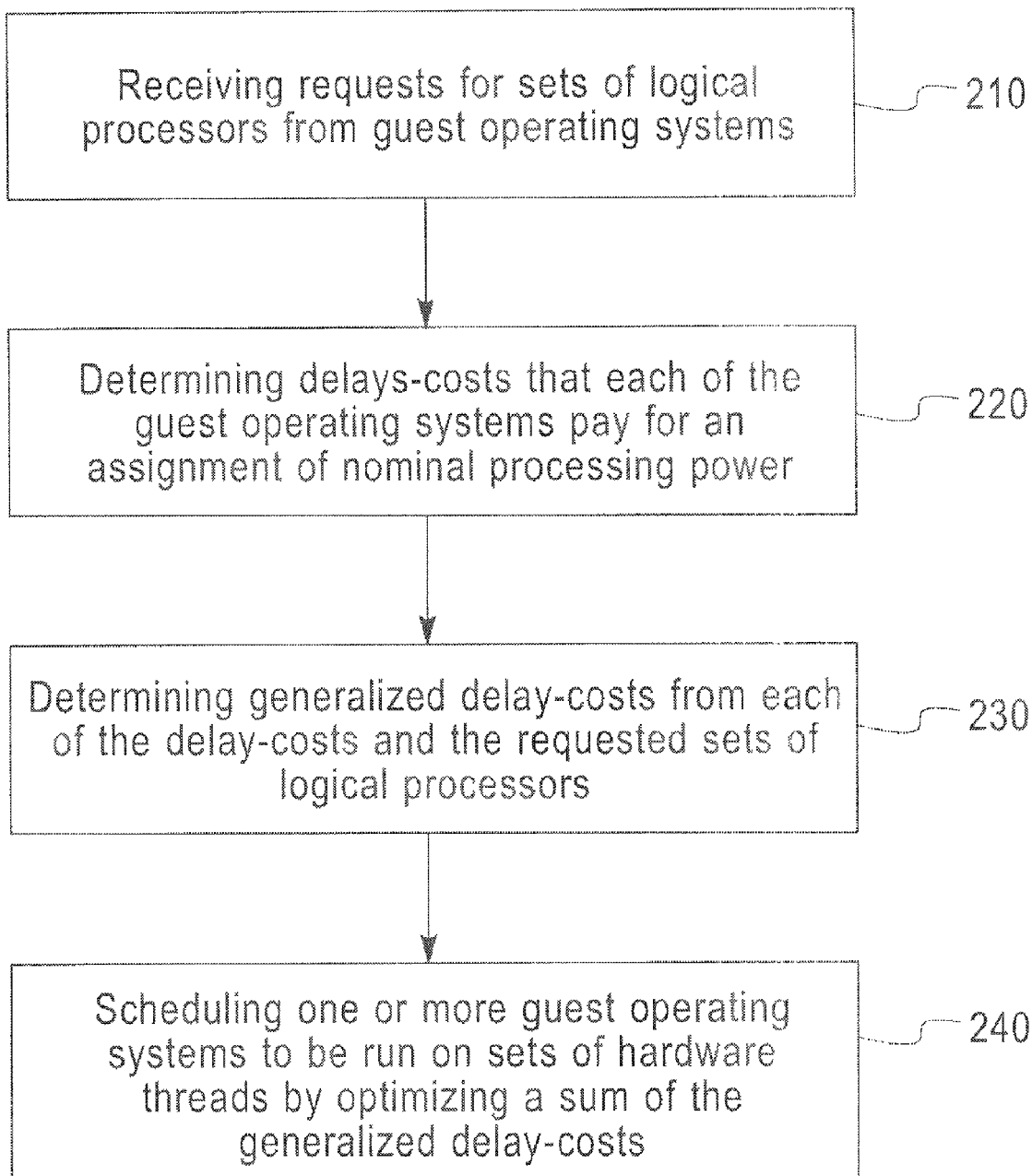
FIG. 2 is flow chart which illustrates a method of scheduling guest operating systems according to an exemplary embodiment of the present invention.

FIG. 2 is flow chart which illustrates a method 200 of scheduling guest operating systems, according to an exemplary embodiment of the present invention. The method 200 may be implemented by the scheduler 155 in the computer system 100 of FIG. 1 for scheduling the guest operating systems 160, 161, 162 to be run on the sets of hardware threads 120, 121, 122, 123. The method 200 will be discussed in relation to FIGS. 1 and 2.

Referring to FIG. 2, the scheduler 155 receives requests for sets of logical processors from the guest operating systems 160, 161, 162 (step 210). The guest operating systems 160, 161, 162 can request any number of logical processors. A logical processor can be used to represent any number of hardware threads of the computer system 100.

The scheduler 155 continues by determining delay-costs $C(i,t)$ that computing jobs $J(i)$, for example, the guest operating systems 170, 171, 172, would pay at a time t for an assignment of nominal processing power (step 220). If the delay-costs $C(i,t)$ remain constant during a scheduling period T, the delay-costs can be denoted $C(i)$.

The scheduler 155 continues by determining generalized delay-costs for each of the computing jobs $J(i)$ based on each of the corresponding delay-costs and each of the corresponding sets of logical processors requested by the computing jobs $J(i)$ (step 230).

The generalized delay-costs may be further based on a speed of processing a corresponding one of the computing jobs $J(i)$, e.g., a guest operating system, on allocated hardware threads of the sets of hardware threads 120, 121, 122, 123 of the multi-threaded processors 110, 111, 112, 113. The speed may be a normalized expected speed $v(i,j)$ of processing a computing job on an allocation of type j. An allocation of type j means that a requested logical processor maps to j hardware threads. One would expect $v(i,j)$ to be greater than $v(i,k)$ if j is greater than k because the more hardware threads allocated a computing job, the faster the speedup. This expectation is supported by such factors as decreased sharing of caches and execution units in the multi-threaded processors 110, 111, 112, 113. A generalized-delay cost $Z_1(i,j)$ based on a normalized speed $v(i,j)$ may be expressed by the following equation 1:

$$Z_1(i,j) = v(i,j) \times C(i) \quad (1)$$

where $Z_1$ can be viewed as the advantage accrued to the computer system 100 by running a guest operating system or job $J(i)$ with relative speed $v(i,j)$.

The generalized delay-costs may be further based on a energy cost of processing a corresponding one of the computing jobs J(i), e.g., a guest operating system, on allocated hardware threads of the sets of hardware threads 120, 121, 122, 123 of the multi-threaded processors 110, 111, 112, 113. The energy costs may be a normalized energy cost U(i,j) of processing a computing job on an allocation of type j. For example, using two multi-threaded processors is likely to use more energy than just using one. An energy cost can be simplified by assuming it to be a constant or the sum of some system constant (i.e., for memory, I/O, power supplies, etc) plus a term which is proportional to the number of multi-threaded processors allocated. A generalized-delay cost $Z_2(i, j)$ based on a normalized speed v(i,j) and a normalized energy U(i,j) may be expressed by the following equation 2:

$$Z_2(i,j)=v(i,j) \times C(i)-U(i,j) \qquad (2)$$

where $Z_2$ can be viewed as the advantage accrued to the computer system 100 by running a guest operating system or computing job J(i) with relative speed v(i,j) and with relative power U(i,j). The greater the speed, the greater the advantage, adjusted by the cost of the power required.

The scheduler 155 continues by scheduling one or more of the computing jobs J(i), e.g., guest operating systems 160, 161, 162, to be run on hardware threads of the multi-threaded processors 110, 111, 112, 113 by optimizing a sum of the generalized delay-costs Z(i,j) of each the computing jobs J(i) (step 240).

The optimization of the generalized delay-costs Z(i,j) can be performed by a first approach which maximizes the sum of the generalized delay-costs Z(i,j) subject to a fairness criterion. Hardware threads are allocated at a maximum cost for which there is sufficient demand. Q(i,j) is referred to as the normalized cost Z(i,j) per hardware thread allocated. If a computing job J(i) is allocated resources at a price Q(i,j) per hardware thread, no J(r) is required to pay an amount Q(k,r) if there is a feasible allocation A(r,s) for J(r) with Q(i,j)<=Q(r,s)<Q(k,r). This is similar to assigning more than one priority to a computing job J(i), as a function of the resources that need to be allocated. Here a job is assigned resources corresponding to its lowest priority required to run.

The demand from a computing job J(i) for threads at a price Q is the maximum number of hardware threads corresponding to a value Q(i,j)>=Q. The clearing price Q* is the highest value of Q at which total demand for threads is equal to or greater than the amount available. As the price Q is lowered, the demand increases.

The first approach can be implemented by using the following procedure. For each computing job J(i), determine the highest value of Q at which this job's demand corresponds to an allocation of type j. Next, determine the clearing price Q* by obtaining the total demand at each Q. Finally, choose an allocation of not more than 4N hardware threads with the greatest Qs.

The procedure of the first approach can be implemented using the following first method having a complexity of $O(M^2)$. For each computing job J(i), obtain the values L(i,j) and Q(i,j) for j=1,2,3,4, where L(i,j) is the number of hardware threads corresponding to an allocation of type j for a computing job J(i), e.g, a guest operating system. Next enter the values for Q(i,j) and L(i,j) in a row V(i) of a matrix V, ordered by decreasing value of Q. Next, starting with the first column of V, and for every column until the demand exceeds 4N, for each value of Q(i,j) in this column, determine the largest L(p,q) in each row which corresponds to a Q(p,q) not smaller than Q(i,j). The sum of the obtained L(p,q) is the demand at price Q(i,j). Next, if the total allocation is greater than 4N, reduce the demand by not scheduling one or more computing jobs J(i), or by giving some computing jobs J(i) a smaller allocation. This can be done by choosing jobs with the lowest value of Q.

The procedure of the first approach can be alternately implemented using the following second method having a complexity of O(MLogM). For each computing job J(i), obtain the values L(i,j) and Q(i,j) for j=1,2,3,4. Next enter the values for Q(i,j) and L(i,j) in a row V(i) of a matrix V, ordered by decreasing value of Q. Next, sort the Qs in the matrix V and via a binary search on the sorted Qs, find the largest Q corresponding to a demand of at least 4N.

FIG. 3 is a table which illustrates the use of the procedure of the first approach, where N=3, each multi-threaded processor has 4 hardware threads, and four jobs or guest operating systems J(1), J(2), J(3), J(4) are present. Referring to FIG. 3, the results show that a price of 7.5 corresponds to a demand of 12, which is the number of available hardware threads. This would correspond to two multi-threaded processors being granted to J(1) and one to J(2).

The optimization of the generalized delay-costs Z(i,j) can be performed by a second approach which maximizes the sum of the generalized delay-costs Z(i,j), with no uniformity. The second approach can be implemented by considering the marginal advantage, per hardware thread, of allocating additional hardware threads to a given computing job J(i). This advantage is defined by the following equation 3:

$$F(i,m,n)=(L(i,m)Q(i,m)-L(i,n)Q(i,n))/m-n) \qquad (3)$$

where F is the marginal per hardware thread advantage of additional hardware threads to a given computing job J(i).

The second approach can be implemented using the following method. For each computing job J(i), obtain the values L(i,m) and F(i,m,n) for m,n=1,2,3,4 where m is greater than n. Next, enter the quantities F(i,m,n) into a sorted list. Next, via a binary search on the sorted Fs, find the largest F corresponding to a demand of at least 4N. Next, if the total allocation is greater than 4N, reduce the demand by not scheduling a job, or giving it a smaller allocation. The demand from a computing job J(i) for threads at a marginal price F is the number of hardware threads corresponding to a value F<=F(i,m,n). When the incremental advantage is F, then m hardware threads can be allocated. The least value of F at which the total demand for threads is equal to or greater than the amount available is the clearing marginal price F*.

Results of the method of the second approach are illustrated in the table in FIG. 4. Referring to FIG. 4, the marginal clearing price F*=5, computing job J(1) is allocated 8 hardware threads, computing job J(2) is allocated 4 hardware threads, and computing job J(3) is allocated 2 hardware threads. However, this sums to 14, which is more than the 12 that are available. To obtain an allocation, one could allocate 4 hardware threads to computing job J(1), or use the first approach, with the computing jobs J(3) and J(4) denied processing. However, if the system had 14 hardware threads available, the above results would have been optimal.

By implementing the above first or second approach, the scheduler 155 determines the allocation types for each of the guest operating systems 160, 161, 162. FIGS. 5a-5d illustrate exemplary allocation types that the scheduler 155 may have chosen to satisfy the requests of the guest operating systems 160, 161, 162.

Figure 5A:
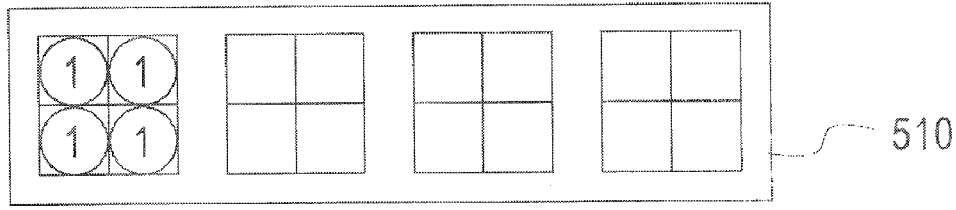
FIGS. 5a, 5b, 5c, and 5d illustrate exemplary allocations of hardware threads to computing jobs, according to an exemplary embodiment of the present invention.
Figure 5B:
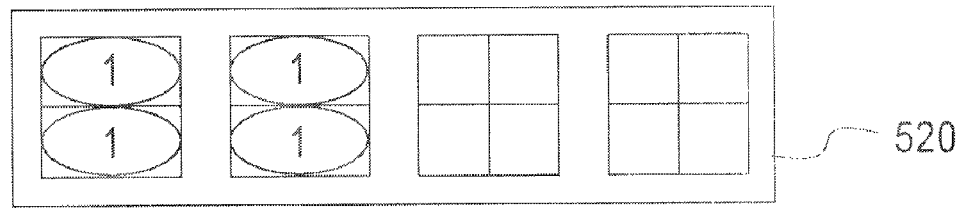
Figure 5C:
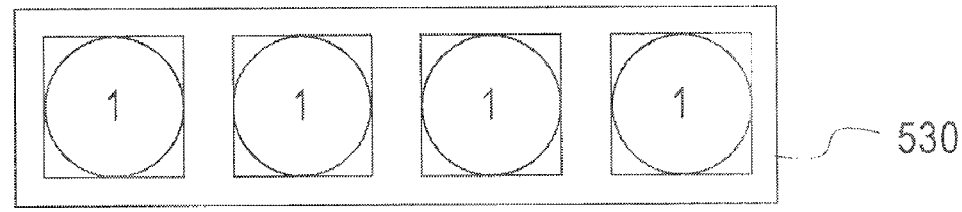

In FIGS. 5a-5c, a computing job 1, for example, one of the guest operating systems 160, 161, 162, requests four logical processors.

FIG. 5a schematically illustrates an exemplary allocation of type j=1 510 by the scheduler 155. Since j=1, each of the logical processors represents one hardware thread for a total allocation of four hardware threads. While FIG. 5a illustrates a single multi-threaded processor 110 being allocated to the computing job 1, the scheduler 155 could have allocated fractions of the multi-threaded processors 110, 111, 112, 113. For example, half of the first multi-threaded processor 110 could have been allocated for two software threads of the computing job 1, while half of the second multi-threaded processor 111 could have been allocated to another two software threads of the computing job 1.

FIG. 5b schematically illustrates an allocation of type j=2 520 by the scheduler 155. Since j=2, each of the logical processors represents two hardware thread for a total allocation of eight hardware threads.

FIG. 5c schematically illustrates an exemplary allocation of type j=4 530 by the scheduler 155. Since j=4, each of the logical processors represents four hardware thread for a total allocation of sixteen hardware threads.

Figure 5D:
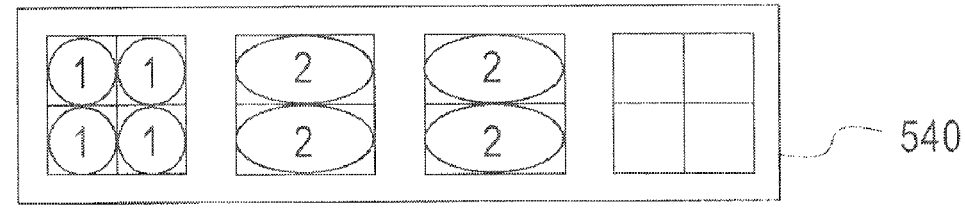

FIG. 5d schematically illustrates an allocation of type j=1 and type j=2 540 respectively, for a computing job 1 and a computing job 2, which each request four logical processors. Since j=1 for computing job 1, the logical processors requested by computing job 1 represent one hardware thread for an allocation of four hardware threads to computing job 1. Since j=2 for computing job 2, the logical processors requested by computing job 2 represent two hardware threads for an allocation of eight hardware threads to computing job 2.

The differences between the first and second approaches can be illuminated by way of the following example. Suppose there are N multi-threaded processors, each with 2 hardware threads, and some number of computing jobs J(i), each requiring a single logical processor. A shadow job sJ(i) can be associated with each computing J(i), which represents the gain from having J(i) running alone on a multi-threaded processor. Under the first approach, a computing job J(i) and its shadow would run if their average cost was in the top 2N. The second approach would choose the top 2N jobs among the {J(i), sJ(i)}, so that a computing job J(i) and its shadow would be chosen if each was in the top 2N, meaning that a computing job J(i) might be required to pay more for resources than another computing job J(k).

Once an allocation has been obtained, an assignment of hardware threads to a computing job J(i), e.g., a guest operating system, may be made to preserve special locality to the extent possible. For example if 4 hardware threads are assigned to a computing job J(i), then these may be assigned on the same multi-threaded processor. More generally, if the number of identical multi-threaded processors on a chip is a power of two and the number of chips on a computer node is also power of two, then a buddy system for thread assignment may be used.

In a buddy system for thread assignment, the number of hardware threads is maintained in neighboring collections of powers of two, in much the same way as a buddy system for dynamic storage allocation. Thread assignment can be done as in memory assignment, for example in order of decreasing allocation. An alternative would be to assign groups of hardware threads in order of decreasing per thread cost. Some method of the latter type may be necessary if running computing jobs J(i) are permitted to remain on their assigned processors from period to period. At each time t, some computing jobs J(i) may complete, and others may receive a different allocation. A change in allocation would provide an opportunity to merge buddies into larger allocatable units.

For affinity reasons, if a computing job J(i), e.g., a guest operating system, is allocated the same number of hardware threads as in the previous period T, it may be given the same assignment. B(i) may be assumed to be the number of entries into a buddy class for $2^i$ hardware threads. The buddy class of i=2 may be comprised of entire multi-threaded processors, with i=1 and i=0 comprised of half multi-threaded processors and single hardware threads. Buddy classes for i>2 can be made neighbors on a chip.

If scheduling is being performed for some period T, the thread assignment in the previous period may be considered. If the allocation is unchanged from the previous period, the assignment during the next period can be the same as before. The remaining threads may be gathered into buddy clusters. Then computing jobs J(i) may be sorted according to the number of hardware threads allocated, and in the order decreasing thread allocation, hardware threads may be assigned to meet the allocation with the least number of breakups of member buddy classes.

It is be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the invention. Accordingly, the protection sought herein is as set forth in the claims below.

What is claimed is:

1. A computer system, comprising:
   a plurality of multi-threaded processors, the multi-threaded processors each having a set of hardware threads forming a pool of hardware threads;
   a plurality of guest operating systems GOS, wherein each GOS requests a number of logical processors that represents a requested number of the hardware threads, and each GOS presents a price for an assignment of nominal processing power; and
   a scheduler to (i) determine generalized costs for each GOS from the corresponding presented price and the corresponding number of requested logical processors, and (ii) schedule at least one of the GOS to be run on an optimal number of the pool of hardware threads,
   wherein the scheduler determines the optimal number based on an optimization of a sum of the generalized costs with respect to a total count of the hardware threads of the pool,
   wherein one of the generalized costs is based on the price presented by the corresponding GOS multiplied by on a speed of processing the corresponding GOS on the number of the pool hardware threads it has requested.

2. The computer system of claim 1, wherein generation of the one generalized cost further includes subtracting an amount of energy consumed by processing the corresponding GOS on the number of the pool of hardware threads it has requested.

3. The computer system of claim 1, wherein the optimization comprises maximizing the sum of generalized costs.

4. The computer system of claim 1, wherein the multi-threaded processors are divided into pools of processors and the optimization is performed separately within each processor pool.

5. The computer system of claim 4, wherein a load of the computer system is balanced by sending a new guest operating system to a corresponding one of the processor pools that has a lowest pool priority.

6. A system for scheduling computing jobs in a computer system, comprising:
- a scheduler to allocate a number of hardware threads from the system to a plurality of computing jobs according to a schedule computed by optimization of an objective function with respect to a total count of hardware threads of the system,
- wherein the objective function is based on a sum of generalized costs, wherein each cost is based on a price presented by a corresponding computing job for an assignment of nominal processing power and a number of logical processors requested by the computing job, each logical processor representing a number of the hardware threads,
- wherein one of the generalized costs is based on the price presented by the corresponding computing job multiplied by a speed of processing the corresponding computing job on the requested number of hardware threads.

7. The system of claim 6, wherein generation of the one generalized cost further includes subtracting an amount of energy consumed by processing the computing job on the requested number of hardware threads.

8. The system of claim 6, wherein the optimization comprises maximizing a result of the objective function.

9. A method of scheduling guest operating systems on a computer system, comprising:
- receiving requests for sets of logical processors from a plurality of guest operating systems, wherein each logical processor represents a number of hardware threads;
- determining a delay-cost for each guest operating system based on a price that each guest operating system presents for an assignment of nominal processing power;
- determining a generalized delay-cost for each guest operating system based on the corresponding delay-cost and the number of hardware threads represented by the corresponding requested set of logical processors; and
- scheduling one or more of the guest operating systems to be run on hardware threads of a computer system by optimizing a sum of the generalized delay-costs with respect to a total count of the hardware threads of the system,
- wherein one of the generalized delay-costs is based on the price presented by the corresponding guest operating system multiplied by a speed of processing the corresponding guest operating system on the requested number of hardware threads.

10. The method of claim 9, wherein generation of the one generalized delay-cost further includes subtracting an amount of energy consumed by processing the corresponding guest operating system on the requested number of hardware threads.

11. The method of claim 9, wherein the optimizing comprises maximizing the sum of the generalized delay-costs.

12. The method of claim 9, wherein generation of the one generalized delay-cost include subtracting an amount of energy consumed by processing the corresponding guest operating system on the number of the hardware threads it has requested.

13. A program storage device readable by machine, tangibly embodying a program of instructions executable by the machine to perform method steps for scheduling guest operating systems on a computer system, the method steps comprising:
- receiving requests for sets of logical processors from a plurality of guest operating systems, wherein each logical processor represents a number of hardware threads;
- determining a delay-cost for each guest operating system based on a price that each guest operating system presents for an assignment of nominal processing power;
- determining a generalized delay-cost for each guest operating system based on the corresponding delay-cost and the number of hardware threads represented by the corresponding requested set of logical processors; and
- scheduling one or more of the guest operating systems to be run on corresponding hardware threads of a computer system by optimizing a sum of the generalized delay-costs with respect to a total count of the hardware threads of the system,
- wherein one of the generalized delay-costs is based on the price presented by the corresponding guest operating system multiplied by a speed of processing the corresponding guest operating system on the number of the hardware threads it has requested.

* * * * *